United States Patent [19]

Seale-Finch

[11] 3,893,637

[45] July 8, 1975

[54] RECORDING AND/OR PLAY BACK APPARATUS

[75] Inventor: Vernon Seale-Finch, Woodcote, England

[73] Assignee: Plessey Handel und Investments A.G., Zug, Switzerland

[22] Filed: Dec. 3, 1973

[21] Appl. No.: 421,186

[30] Foreign Application Priority Data

Dec. 2, 1972 United Kingdom ............... 55751/72

[52] U.S. Cl. ................................ 242/206; 242/210

[51] Int. Cl. ......................... G03b 1/04; G11b 15/32

[58] Field of Search ............................ 242/200–204, 242/206–210; 360/88–96

[56] References Cited

UNITED STATES PATENTS 3,286,943 11/1966 Morimoto ........................... 242/201

3,408,017 10/1968 Hashimoto .......................... 242/200

*Primary Examiner*—Leonard D. Christian

*Attorney, Agent, or Firm*—Scrivener Parker Scrivener & Clarke

[57] ABSTRACT

A tape recording or play back apparatus wherein the magnetic tape is constrained to pass magnetic head means under substantially constant tension by reason of its position between a pinch roller assembly and a tape take-up spindle so that in operation of the apparatus tape passes from the pinch roller capstan assembly across the magnetic head means to be collected on the tape take-up spool.

1 Claim, 1 Drawing Figure

PATENTED JUL 8 1975
3,893,637
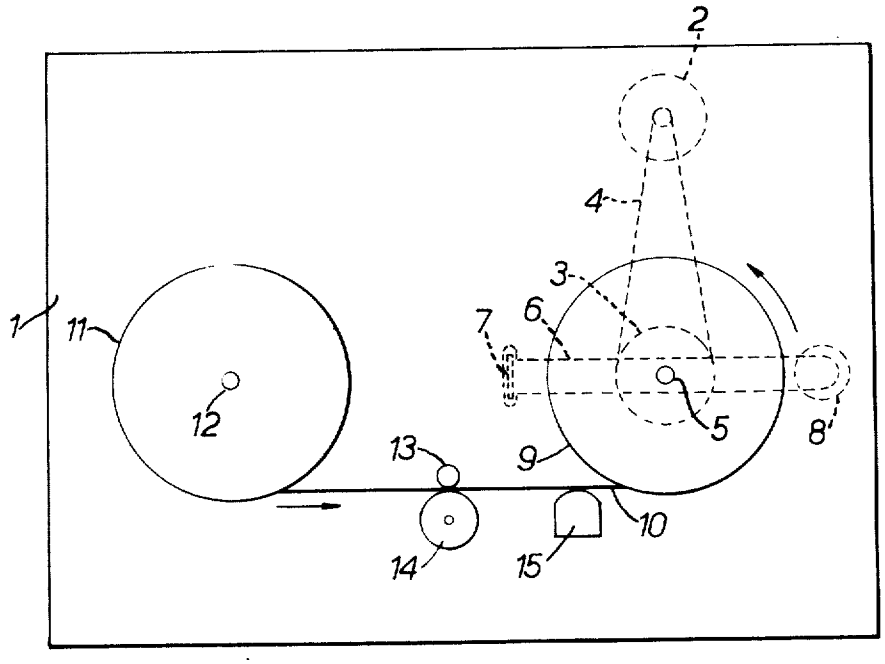

RECORDING AND/OR PLAY BACK APPARATUS

This invention relates to magnetic tape recording and/or play back apparatus, and more especially it relates to such apparatus for use in the recording and/or play back of audio signals.

According to the present invention magnetic tape recording and/or play back apparatus comprises a feed spindle for receiving a tape spool, a take-up spindle for receiving a tape take-up spool, said take-up spindle being operatively associated with drive means including a clutch through which it can be driven for tape take up purposes, a capstan and pinch roller assembly for feeding tape to the take-up spool and a magnetic head assembly positioned between the capstan and pinch roller assembly and the take-up spindle so that in operation of the apparatus tape passes from the pinch roller and capstan assembly across head means forming part of the magnetic head assembly to be collected on the tape take-up spool driven by the take-up spindle.

In known tape recording and/or play back apparatus the magnetic head assembly is positioned in between the feed spindle and the capstan and pinch roller assembly. This can result in undesirable wow and flutter occurring due to variations in tension of the tape, or due to the tape or the feed spindle or its associated spool sticking slightly.

The present invention will now be described by way of example with reference to the accompanying drawing which is a generally schematic plan view of a tape deck suitable for recording and/or play back.

The apparatus comprises a base or chassis 1 which carries on one side a motor 2 which is coupled to a drive pulley 3 by means of a drive belt 4. The drive pulley 3 is engaged for driving purposes with a take-up spindle 5 by means of a solenoid operated clutch arrangement comprising an actuator arm 6 hinged at position 7 and operated by means of a solenoid 8 to engage the clutch. The parts thus far referred to are supported on the underside of the base 1 and are therefore shown in broken lines. The take-up spindle 5 is engaged by means of a conventional splined arrangement with a tape take-up spool 9 which in this embodiment forms part of a cassette (not shown in detail). Magnetic tape 10 is fed to the take-up spool 9 from a feed spool 11 which is carried on a feed spindle 12. The tape is drawn from the feed spool 11 by a drive force imposed on the tape by means of a driven capstan 13 (the driving connection to which is not shown) and a pinch roller 14 which are arranged to pinch between them the tape 10 in driving engagement. The tape is fed from the capstan and pinch roller assembly 13 and 14 to pass across a magnetic head assembly 15 which is used to provide the functions of record, erase and play back, and might comprise separate heads.

An arrangement according to the present invention wherein a magnetic head assembly is positioned between the pinch roller assembly and the take-up spindle, tends not to suffer from the disadvantage of wow and flutter due to tape tension variations, since tape is constrained to pass the head means under substantially constant tension and therefore wow and flutter due to uneven tape tension is minimised.

It will be appreciated that tape recording and/or play back apparatus according to the present invention may be constructed utilising conventional techniques and one particularly suitable form of cassette tape recorder construction to which the present invention could be applied is described in our co-pending U.S. Pat. application Ser. No. 377,462.

What we claim is:

1. A method of magnetic tape recording and/or playback utilising apparatus comprising a feed spindle, a tape feed spool received upon the feed spindle, a tape take-up spindle, a tape take-up spool received upon the tape take-up spindle, drive means, a clutch through which torque is transmissable from the drive means to the tape take-up spindle, a capstan and pinch roller assembly, head means forming part of a magnetic head assembly and operable to provide the function of record/playback, the head means being positioned between the capstan and pinch roller assembly and the take-up spindle, the method comprising drawing tape from the said feed spool by means of the capstan and pinch roller assembly and further drawing by means of the tape take-up spool tape from the said capstan and pinch roller assembly across the said head means to effect the record and playback function.

* * * * *